JACOB HINDS, OF HINDSBURG, NEW YORK.

Letters Patent No. 88,873, dated April 13, 1869.

IMPROVED COMPOUND FOR DESTROYING INSECTS.

The Schedule referred to in these Letters Patent and making part of the same

*To all whom it may concern:*

Be it known that I, JACOB HINDS, of Hindsburg, in the county of Orleans, and State of New York, have invented a new and improved Insect-Destroyer; and I do hereby declare that the following is a full, clear, and exact description thereof, which will enable others skilled in the art to make and use the same.

This invention relates to a new and useful composition for destroying insects on vines, trees, and shrubbery, and which composition, when used in connection with coal-tar, or pine-tar, is a specific against the ravages of the "wire worm."

The invention and discovery consist in forming a compound of the ingredients hereinafter named, in about the proportions mentioned.

In carrying out my invention, I make use of the following ingredients, viz:

One-fourth of an ounce of cobalt, one-fourth of an ounce of pulverized black pepper, one-fourth of an ounce of pulverized white hellebore, and two ounces of assafetida.

The above-named ingredients are dissolved together in one gallon of warm rain-water, and thoroughly mixed together.

Two quarts of this compound, combined with water sufficient to cover a bushel of seed, with the seed soaked therein, and the seed afterwards combined or mixed with coal or pine-tar, effectually prevent the ravages of the wire worm.

Having thus described my invention,

I claim as new, and desire to secure by Letters Patent—

A compound for destroying insects, composed of the above-mentioned ingredients, used in about the proportions named, substantially as described.

JACOB HINDS.

Witnesses:
RUSSEL WILLIAMS,
SAMUEL O. FRANCIS.